United States Patent [19]

Ball et al.

[11] 4,196,134

[45] Apr. 1, 1980

[54] VEGETABLE OIL ADDUCTS

[75] Inventors: Frank J. Ball, Charleston; John R. Powers, Mt. Pleasant; William G. Vardell, Charleston, all of S.C.

[73] Assignee: Westvaco Corporation, New York, N.Y.

[21] Appl. No.: 963,181

[22] Filed: Nov. 24, 1978

Related U.S. Application Data

[63] Continuation of Ser. No. 764,061, Jan. 31, 1977, abandoned.

[51] Int. Cl.$^2$ ............................ C09F 5/00; C09F 7/00; C11C 3/00
[52] U.S. Cl. ........................... 260/404.8; 260/410.8; 260/404; 252/108; 252/117
[58] Field of Search ............... 260/404, 404.8, 404.5, 260/410.8; 252/117, 108

[56] References Cited

U.S. PATENT DOCUMENTS

| | | | |
|---|---|---|---|
| 2,188,882 | 1/1940 | Clocker | 260/405 |
| 2,312,731 | 3/1943 | Salathiel | 252/342 |
| 2,426,338 | 8/1947 | Blair | 260/404.8 |
| 2,567,409 | 9/1951 | Trent | 260/398.5 |
| 2,678,934 | 5/1954 | Grummitt | 260/404.8 |
| 2,839,550 | 6/1958 | Wiggerink | 260/404.8 |
| 2,938,044 | 5/1960 | Dazzi | 260/404.8 |
| 3,253,938 | 5/1966 | Hunt | 106/252 |
| 3,639,650 | 2/1972 | Cummings | 260/404.8 |
| 3,734,859 | 5/1973 | Ward | 252/108 |

FOREIGN PATENT DOCUMENTS

| | | |
|---|---|---|
| 973398 | 6/1960 | Fed. Rep. of Germany. |
| 647352 | 8/1948 | United Kingdom. |
| 1032363 | 6/1966 | United Kingdom. |
| 1039787 | 8/1966 | United Kingdom. |

OTHER PUBLICATIONS

Teeter, H. et al., JAOCS, pp. 158–162 (1948).
March, Advanced Organic Chemistry: Reactions, Mechanisms and Structure, pp. 601–605 and 626–636 (1968).

*Primary Examiner*—John F. Niebling
*Attorney, Agent, or Firm*—Ernest B. Lipscomb, III; Terry B. McDaniel

[57] ABSTRACT

Disclosed herein are compounds of the general formula

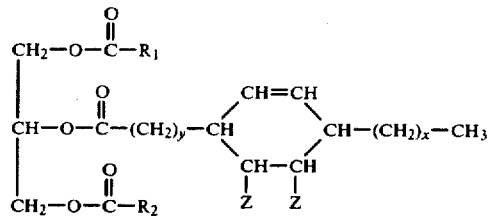

wherein x and y are integers from 3 to 9, x and y together equal 12, one Z is hydrogen and the other Z is a carboxylic acid group, and $R_1$ and $R_2$ are fatty acid groups. A process for introducing approximately one carboxylic acid group per triglyceride molecule in vegetable oils has been developed, and the resulting acid adduct forms soaps with attractive properties. The process comprises first conjugation of the double bonds of the nonconjugated polyunsaturated groups present in the fatty acid ester and elaidinization with a catalyst, such as iodine, and then adduct formation with acrylic acid to form the compounds of the general formula. This process also greatly stabilizes the triglyceride against atmospheric oxidation and polymerization reactions.

5 Claims, No Drawings

VEGETABLE OIL ADDUCTS

This is a continuation, of application Ser. No. 764,061, filed Jan. 31, 1977, now abandoned.

BACKGROUND OF THE INVENTION

(1) Field of the Invention

This invention relates to vegetable oil adducts. This invention also relates to soaps of the vegetable oil adducts as well as to processes for making same. More specifically, this invention relates to adducts prepared from vegetable oils containing nonconjugated polyunsaturated fatty acid esters which are conjugated and then modified via Diels-Alder addition with acrylic acid.

(2) The Prior Art

The literature on the Diels-Alder reaction of dienophiles and fatty acids, their esters or oils is very complex and over lapping. Often the prior art is imprecise and vague. However, British Pat. No. 762,122 of Nov. 21, 1956, describes a process for making condensation products of unsaturated fatty acids and oil using $I_2$ as a conjugation/elaidinization and condensation catalyst with a number of dienophiles. According to the claims of British Pat. No. 762,122 a dienophile was reacted with the fatty acid in the presence of iodine.

U.S. Pat. No. 3,639,650 to Cummings teaches a sulfur dioxide conjugation/isomerization process for the Diels-Alder reaction of a maleic ester with vegetable oils wherein the sulfur dioxide is bubbled through the liquid reaction mixture.

U.S. Pat. No. 3,253,938 to Hunt describes a process for making a surface coating resin including the reaction product of a triglyceride ester of unsaturated fatty acids and certain carboxylic acids or anhydrides to yield a water-soluble salt.

U.S. Pat. Nos. 3,734,859 and 3,753,968 to Ward describe a process for making condensation products of fatty acids and acrylic acid and soaps made therefrom.

It has been found that increasing the carboxyl content of vegetable oils containing polyunsaturated fatty acid esters yields new products with unique and useful properties. It is, therefore, the general object of this invention to provide adducts of vegetable oils which have substantial polyunsaturated fatty acid groups and acrylic acid. Another object of this invention is to provide soap compositions made from the vegetable oil adducts. Yet another object of this invention is to provide a two-step process for making the vegetable oil adducts.

Other objects, features and advantages will be evident from the following disclosure.

SUMMARY OF THE INVENTION

It has been found that vegetable oil adducts may be made from vegetable oils having polyunsaturated fatty acid ester groups in the triglyceride molecule thereby increasing the carboxyl content of the fatty acid ester groups. These vegetable oil adducts are made by first conjugating and elaidinizing the nonconjugated portion of the polyunsaturated fatty acid, mainly linoleic acid, followed by Diels-Alder addition with acrylic acid. It is essential that the conjugation and elaidinization take place before the acrylic addition. The vegetable oil adducts form triglyceride acids of the general formula

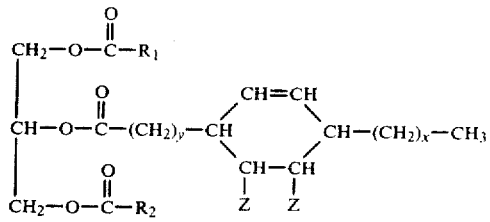

wherein x and y are integers from 3 to 9, x and y together equal 12, one Z is hydrogen and the other Z is a carboxylic acid group, and $R_1$ and $R_2$ are saturated/unsaturated hydrocarbon radicals. These triglyceride acids may be converted into their soap form.

DETAILED DESCRIPTION OF THE INVENTION

Vegetable oil triglycerides are relatively homogeneous with respect to distribution of linoleic acid in the molecule. Linoleic acid is usually found on the 2-position or middle position of the glyceride with the remainder above 33% on the 1,3 positions. However, in soybean oil 50% of the molecules have linoleic on the 1 or 3 positions. Statistically then at least 90% of the triglycerides in soybean oil would have an acrylic acid reactive fatty acid group present. The same is true for cottonseed oil and corn oil. Linolenic acid and elaeostearic acid are also reactive permitting the use of linseed oil. Thus, the vegetable oils useful in the present invention are preferably those having at least 50% polyunsaturated fatty acids in the triglyceride molecule. Examples of other vegetable oils for use in this invention include safflower oil and sunflower oil. Among vegetable oils which are not useful in this invention are palm oil and castor oil having 9.5% and 3.1% linoleic acid, respectively.

The process of this invention differs from those reported in the literature and appears to be specific for the production of the mono-acrylic acid adduct of vegetable oil using a conjugation catalyst. It appears the acrylic acid adduct can only be made if the reactive acid fraction of the oil is first converted to the conjugated isomers and then reacted by the slow addition of acrylic acid. When acrylic acid and the conjugation catalyst are added together, conjugation is almost short-stopped and yields of adduct are low.

The conjugation/elaidinizing catalyst employed in the process of this invention includes iodine or a compound capable of generating iodine, sulfur dioxide or nickel. Compounds capable of generating iodine include, for example, hydriodic acid, iodine mono-chloride, iodine trichloride and iodine mono-bromide. When sulfur dioxide is the catalyst, it is added as the free compound. When nickel is the catalyst, it is typically used as an activated nickel on carbon catalyst.

In carrying out the process of this invention, the vegetable oil is heated with the catalyst at from about 200° C. to 270° C. said catalyst being present in an amount from about 0.05% to 1.5% by weight catalyst based on vegetable oil. At temperatures above 270° C. undesirable disproportionation reaction begins to take place. Preferred conditions which minimize the catalyst required and maximize the total conjugated linoleic acid present at any one time are from 230° C. to 260° C. with 0.1% to 0.8% catalyst based on weight of oil. In soya oil preferred conjugation times of 20-30 minutes give a maximum of 36% conjugated linoleic acids present in that time range. Sixty (60%) percent of these are the acrylic reactive trans, trans isomer. Slow conjugation of a portion of the remaining linoleic acid occurs while acrylic acid is present, and heat isomerization converts the other conjugated isomers to the reactive trans, trans isomer.

After the desired maximum of conjugated linoleic acid is present, the temperature is maintained while the acrylic acid is added. It is desirable to add the acrylic acid slowly over, say for example, about a 10–120-minute period to prevent loss of acrylic acid through polymerization to polyacrylic acid. The amount of acrylic acid added may be up to the amount of reactive trans, trans sites in the reactive fatty acid. The addition reaction is continued until substantially all of the acrylic acid condenses with the vegetable oil, usually about one hour.

Using the above-described process, acrylic adducts of vegetable oil having the following general formula are formed:

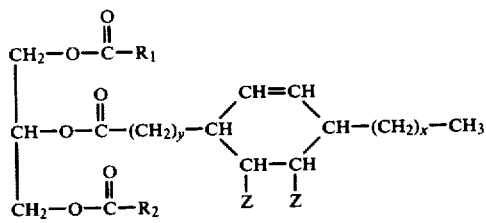

wherein x and y are integers from 3 to 9, x and y together equal 12, one Z is hydrogen and the other Z is a carboxylic acid group, and $R_1$ and $R_2$ are saturated/unsaturated hydrocarbon radicals, specifically, saturated-/unsaturated hydrocarbon terminals of fatty acids esterified with glycerol. As will be appreciated by those skilled in the art, $R_1$ and $R_2$ may in fact include some unreacted linoleic acid or other reactive fatty acid fraction as it is not necessary to form adducts at all of the reactive sites to produce good products. Depending upon the amount of conjugated reactive fatty acid at the three positions and the amount of acrylic acid present during the reaction, some amounts of the adduct may be present at the 1 and 3 positions represented by $R_1$ and $R_2$. It is intended that use of the term "general formula" is to include those adducts having some additions at the 1 and 3 positions and also adducts wherein not all reactive sites are formed into adducts. However, when $R_1$ and $R_2$ are not reactive saturated/unsaturated hyrocarbon radicals, they are predominately fatty acid fractions of palmitic acid, stearic acid, and oleic acid.

The physical and chemical properties of the acrylic adducts of soybean oil are tabulated below (theoretical values are given in parenthesis):

| Acid Number | 67.5 | (59.3) |
|---|---|---|
| Saponification Number | 227 | (237) |
| Color (Gardner) | 4. | |
| Viscosity (Gardner) | U | |

The acrylic acid adducts may be converted to soaps by various neutralizing agents to form soaps or salt of the formula

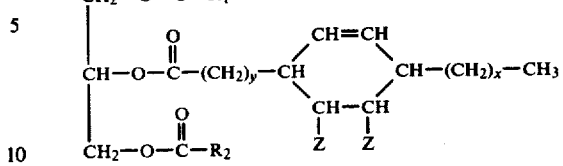

wherein x and y are integers from 3 to 9, x and y together equal 12, one Z is hydrogen and the other Z is COOM, $R_1$ and $R_2$ are saturated/unsaturated hydrocarbon radicals, and M is a member of the group consisting of sodium, potassium, lithium, ammonium and organic amines. Organic amines specifically contemplated include triethylamine, monoethylamine, diethylamine, and alkanolamines such as ethanolamine, triethanolamine and diethanolamine. These soaps are effective wetting agents and coupling agents.

The following examples are illustrative of the practice of this invention.

EXAMPLE 1

This example illustrates the satisfactory isomerization of the linoleic acid fraction in soya oil to the conjugated form.

In stainless steel reactors 40 grams of soya oil were catalyzed with 0.2% and 0.4% $I_2$ in a hot oil bath at 252° C. (485° F.). Samples were drawn at selected time intervals and the fatty acids analyzed by GLC after splitting and esterifying using AOCS method CC 2-66. The results are shown in Table I.

TABLE I

The Rate of Conjugation of Linoleic Acids In Soybean Oil At 252° F. Using 0.2% And 0.4% Iodine As Catalyst

| % $I_2$ | Fatty Acid | Soybean Oil | Conjugation Time, Min. | | | | |
|---|---|---|---|---|---|---|---|
| | | | 5 | 20 | 40 | 80 | 120 |
| | Linoleic | 50.9 | 41.6 | 32.6 | 28.2 | 25.2 | 24.0 |
| 0.2 | t,t-conj. Linoleic | 0 | 5.3 | 10.4 | 14.5 | 15.6 | 15.2 |
| | Total Conjugated Isomers + Linolenic | 7.0 | 14.5 | 21.6 | 27.4 | 28.1 | 27.0 |
| | Linoleic | 50.9 | 18.9 | 9.4 | 5.7 | 3.3 | 3.5 |
| 0.4 | t,t-conj. Linoleic | 0 | 14.6 | 19.8 | 22.0 | 21.3 | 18.6 |
| | Total Conjugated Isomers + Linolenic | 7.0 | 26.2 | 33.2 | 36.1 | 35.0 | 31.8 |

EXAMPLE 2

This example clearly shows that acrylic acid inhibits iodine isomerization of the vegetable oil, and thus a two-step process is required.

In a 600-gram cook, 0.4% $I_2$ and one mole of acrylic acid 872 grams of soybean oil were added at room temperature to a kettle heated to 252° C. and held drawing samples at intervals. Under these conditions, linoleic conjugation was almost completely short stopped. After 2 hours, the linoleic content of the fatty acids had only dropped to 44.7% from the starting 50.9. The results are shown in Table II.

TABLE II

The Effect of Acrylic Acid Added to Soybean Oil Containing 0.4% Iodine Conjugation Catalyst And Reacted At 252° C.

| Fatty Acid | Soybean Oil (%) | % at Cook Time, Min. | | | | | % at 120 Min. Corr'd* |
|---|---|---|---|---|---|---|---|
| | | 10 | 20 | 40 | 80 | 120 | |
| Palmitic Acid | 10.7 | 11.6 | 11.8 | 12.2 | 13.0 | 13.1 | 10.7 |
| Oleic Acid | 26.0 | 26.6 | 27.1 | 28.0 | 29.2 | 30.2 | 24.7 |
| Linoleic Acid | 50.9 | 49.4 | 48.5 | 47.7 | 45.8 | 44.7 | 36.5 |
| t,t-Linoleic | 0 | 0 | 0.2 | 0 | 0.2 | 0.2 | 0.2 |
| Total Conjugated Linoleic + Linolenic | 7.0 | 6.6 | 6.9 | 6.0 | 5.8 | 5.4 | 4.4 |

*120 minutes fatty acid assays corrected using the soybean oil palmitic acid content as an internal standard.

As shown in Table II, the palmitic acid content had risen indicating that a $C_{21}$-cycloaliphatic dicarboxylic acid and/or a $C_{36}$-dimer acid had formed. Using the palmitic as an internal standard gave the final "corrected" column in Table II. It indicated that disproportionation was negligible and that 18.3 weight percent of the fatty acids had been removed by reaction compared with 7.0% of the linoleic plus linolenic having disappeared. GLC analyses on OV-1 columns indicated 9.5% $C_{21}$-cycloaliphatic dicarboxylic acid and about 3% $C_{36}$-dimer acid were formed.

EXAMPLE 3

This example illustrates the process of producing the mono-acrylic acid adduct using the two-step process of this invention. The linoleic acid in soybean oil was not conjugated by $I_2$ in the presence of acrylic acid as shown in Example 2. It was found that conjugating the oil first to a desired degree and then adding the acrylic acid was unexpectedly effective. The data in Table I indicated that 0.4% $I_2$ was a good catalyst level and that 36% total conjugated linoleic would be present after 40 minutes at 225° C. If the acrylic acid was added then, it would react quickly with the trans, trans isomer and with the remaining conjugated isomers when they were heat-isomerized to that form. The following procedure was tried. The soya oil with 0.4% $I_2$ was heated to 252° C., held for 40 minutes, then cooled rapidly to room temperature. The kettle was opened; one mole of acrylic acid per 872 grams oil was added and the cook reheated to 252° C. Samples were drawn for analysis as shown in Table III.

TABLE III

Soybean Oil Preconjugated With 0.4% $I_2$ for 40 Minutes at 252° C.
Cooled, 1 Mole of Acrylic Acid Added, and Reacted at 252° C.

| Fatty Acid | Soybean Oil, % | Conjugation Time, Min. | | Acrylic Acid Reaction Time, Min. at 252° C. | | | | |
|---|---|---|---|---|---|---|---|---|
| | | 30 | 40 | 1 | 10 | 20 | 30 | Final |
| Palmitic Acid | 10.7 | 13.9 | 12.8 | 17.6 | 19.0 | 19.4 | 20.8 | 19.5 |
| Oleic Acid | 26.0 | 37.3 | 35.0 | 44.9 | 48.8 | 52.0 | 52.2 | 53.1 |
| Linoleic Acid | 50.9 | 8.7 | 8.2 | 9.7 | 10.0 | 9.1 | 9.3 | 10.8 |
| t,t-Linoleic | 0 | 15.6 | 23.8 | 6.2 | 3.6 | 2.4 | 1.6 | 1.1 |
| Total Conjugated Linoleic + Linolenic | 7.0 | 26.8 | 37.4 | 16.9 | 11.9 | 8.1 | 5.1 | 6.5 |

Fatty acid analyses corrected for $C_{21}$-dicarboxylic acid formed by using palmitic acid content of 40-minute conjugated sample as internal standard

| | | | | | | | | |
|---|---|---|---|---|---|---|---|---|
| Palmitic Acid | | | 12.8 | 12.8 | 12.8 | 12.8 | 12.8 | 12.8 |
| Oleic Acid | | | 35.0 | 32.7 | 32.9 | 34.3 | 32.1 | 34.9 |
| Linoleic Acid | | | 8.2 | 7.1 | 6.7 | 6.0 | 5.7 | 7.1 |
| t,t-Linoleic | | | 23.8 | 4.5 | 2.4 | 1.6 | 1.0 | 0.7 |
| Total Conjugated Linoleic + Linolenic | | | 37.4 | 12.3 | 8.0 | 5.3 | 3.1 | 4.3 |
| Fatty Acids Lost During Acrylic Acid Reaction (Calculated) | | | | 27.3 | 32.6 | 34.0 | 38.5 | 34.4 |
| % $C_{21}$-Cycloaliphatic Dicarboxylic Acid by GLC Analysis | | | | | | | | 31.4 |

The results indicated that the acrylic acid had reacted readily with almost all the reaction occurring in the first 20 minutes. Based on the apparent increase in palmitic acid, 34.4% of the fatty acids were "lost" from the fatty acids determined. This is close to theoretical for one mole of acrylic acid reacted. GLC analysis, however, indicated the presence of 31.4% $C_{21}$-cycloaliphatic dicarboxylic acid. Very little disproportionation occurred when the acrylic acid was present based on the fact the corrected oleic acid content of the fatty acids did not change. The product was found to have a 4 Gardner color compared to a starting value of 10¼ for the oil. Soybean oil heat bleaches easily during the reaction conditions used. Other analyses were acid number 67.5 and saponification number 230.

EXAMPLE 4

The objective of this example was to determine the iodine level/temperature combination which would maximize the total conjugated isomers present at any one time. Combinations which would minimize the amount of iodine used at reasonably low conjugation times would be most acceptable for production purposes. Acrylic acid addition should start just before the total conjugated maximum to minimize side reactions and products. The data for this example was obtained by charging 40 grams of soybean oil containing the required iodine level into a small stainless steel reactor. The reactor was placed in a bath maintained at the desired temperature. Samples were drawn at selected time intervals and, after splitting and esterification of the fatty acids, analyzed on GLC.

TABLE IV

The Effect of Temperature And $I_2$ Catalyst Level On The Level of Conjugated Linoleic Acid Isomers Present In Soybean Oil

| Temp. °C. | $I_2$ Level | Total Conjugated Linoleic Isomers, % Conjugated Time, Min. | | | | | | |
|---|---|---|---|---|---|---|---|---|
| | | 0 | 10 | 20 | 30 | 40 | 60 | 80 |
| 260 | 0.3 | 7.1 | 30.4 | 33.8 | 33.3 | 29.6 | — | 25.7 |
| | 0.2 | 7.4 | — | 20.6 | 28.6 | 29.2 | 30.1 | 29.6 |
| | 0.1 | 7.6 | — | 10.2 | — | 9.3 | — | 9.4 |
| 252 | 0.8 | 7.0 | 18.0 | 18.3 | — | — | — | 16.3 |
| | 0.3 | 7.1 | 31.9 | 33.7 | 34.9 | 36.4 | 36.3 | 35.8 |
| | 0.25 | — | 27.1 | 30.5 | 32.1 | 33.9 | 34.6 | 34.2 |
| | 0.2 | — | 18.2 | 26.8 | — | 28.9 | 27.3 | 31.7 |
| 230 | 0.35 | 7.3 | 29.7 | 32.9 | 33.4 | 33.5 | 35.4 | 35.6 |
| | 0.3 | 7.3 | 26.9 | 29.3 | 29.8 | 32.5 | 33.5 | 34.2 |

The data shown in Table IV indicates that the maximum total conjugated linoleic acid for the soya oil used which at equilibrium was about 35–36%. This maximum was most economically attained by using about 0.3% iodine at about 252° C. (485° F.). Higher temperatures lower the maximum TCL and lower temperatures extend the time at which it is attained. Lower catalyst levels at 252° C. extend the time of the maximum TCL and thus lower the maximum level via competing reactions. TCL means total conjugated linoleic acid.

EXAMPLE 5

A series of three runs was made to determine the effect that varying the conjugation time before acrylic addition was started would have on the amount of reaction occurring. Conjugation was carried out at 252° C. with 0.3% iodine for various times. Addition of 1.1 moles and 1.05 moles of acrylic acid per mole soybean oil was started after 5, 10, 20, and 30 minutes conjugation time at 252° C. The acrylic acid was added at a constant rate. A pressure of about 55 psi. held throughout the rest of the addition schedule until samples were drawn.

TABLE V

Reaction Conditions And Product Properties Of All Acrylic Acid Modified Soybean Oil Adducts

| Run No. | $I_2$ Conjugation at 252° C. and 0.3% $I_2$ | | Acrylic Addition at 252° C. | | Additional Cooking Time | | Final Cook Properties | | | |
|---|---|---|---|---|---|---|---|---|---|---|
| | Time Min. | Total Conj. Linoleic | Moles | Time of Addn., Min. | Temp. °C. | Min. | % $C_{21}$-Dicarboxylic Acid | AN | Color | Polyacrylic Cloudiness |
| 1 | 10 | 35.1 | 1.10 | 13.9 | 252 | 55 | 33.4 | 73.9 | 4 | Almost None |
| 2 | 20 | 35.9 | 1.10 | 13.6 | 252 | 45 | 31.0 | 74.3 | 4+ | Almost None |
| 3 | 30 | 36.5 | 1.10 | 14.1 | 252 | 45 | 32.2 | 74.0 | 4– to 4 | Almost None |
| 4 | 5 | 34.6 | 1.05 | 25.1 | 252 | 75 | 27.2 | 68.7 | 4 | Almost None |
| 5 | 20 | 34.6 | 1.05 | 26.9 | 252 | 90 | 33.1 | 66.9 | 4¼ | Almost None |
| 6 | 20 | 36.2 | 1.05 | 25.1 | 252 | 60 | 33.5 | 68.4 | 4+ | Almost None |

Analysis results from these runs are shown in Table V. The time that acrylic addition was started made surprisingly little difference in the amount of $C_{21}$-dicarboxylic acid found in the final cooks. Some linoleic acid conjugation apparently continues after acrylic addition is started but at a much slower rate than before. On balance, it appeared as if starting after 10 to 20 minutes conjugation time might be better than 30 minutes in that more residual linoleic acid was present to give further acrylic reaction if the reaction time was extended. longer reaction time would have apparently given more $C_{21}$-dicarboxylic acid product.

EXAMPLE 6

In selecting another vegetable oil on which to demonstrate the process, corn oil was chosen. It has about 55% linoleic acid and 0.5% linoleic acid according to the literature. It is said to be very easily bleached and not subject to color reversion after treatment. A cook of corn oil from Welch, Holme and Clark labeled "Refined Corn Oil" was made using the same $I_2$, temperature, and time conditions found best for soybean oil. It was conjugated for 20 minutes using 0.3% $I_2$ and 1.05 moles acrylic acid added continuously over 26 minutes. It was cooked for 65 minutes after the start of acrylic addition.

TABLE VI

| Fatty Acid | Corn Oil | Conjugation Time, 20 Min. | Acrylic Acid Reaction Time, Min. at 252° C. | | |
|---|---|---|---|---|---|
| | | | 25 | 45 | 65 |
| Palmitic Acid | 12.09 | 12.3 | 13.4 | 14.6 | 15.3 |
| Oleic Acid | 25.3 | 24.9 | 27.6 | 28.9 | 30.4 |
| Linoleic Acid | 58.2 | 49.4 | 50.5 | 49.2 | 48.3 |
| t,t-Linoleic Acid | 0 | 5.4 | 0.3 | — | — |
| Total Conjugated Linoleic + Linolenic | 1.4 | 10.6 | 4.9 | 4.2 | 2.8 |
| Fatty Acids Lost During Acrylic Acid Reaction Calc. From Palmitic Increase | | | 8.3 | 15.9 | 19.7 |

The product had a color of Gardner 3, had almost no apparent polyacrylic acid but smelled of acrylic acid.

EXAMPLE 7

A most unusual aspect of these vegetable oil adducts is that stable white fluids were spontaneously formed in the lower solids range when soaps of the adducts were diluted with water. Liquids as close to 100% solids as possible were prepared and diluted in steps with small increments of distilled water to note the various phases the soaps went through on dilution. Considerable differences were noted between the various amines and alkaline earth soaps. These are summarized in Table VII.

TABLE VII

| Alkali | Solids Range % | Remarks |
|---|---|---|
| NH₃ | 96–70 | Clear fluid increasing in viscosity |
| | 70–45 | Clear gel |
| | 45–33 | Whitish gel |
| | 33–23 | White becoming more fluid |
| | 23–0.4 | Fluid |
| Triethanol Amine | 100–85 | Clear fluid increasing in viscosity |
| | 85–73 | Clear gel |
| | 73–60 | Becoming cloudy and less viscous |
| | 60–0.07 | Fluid |
| KOH | 98–50 | Viscous clear gel |
| | 50–25 | Thinner clear gel becoming cloudy |
| | 25–20 | Unstable white thick fluid |
| | 20–1 | Stable white fluid |
| NaOH | 95–49 | Viscous clear gel |
| | 49–28 | Clear gel becoming less viscous |
| | 28–20 | Becoming whiter |
| | 20–0.4 | Stable opalescent fluid |

It is notable that the fluids at or close to 100% solids could be prepared with both ammonia and triethanol amine. The same would probably be true of other amines and alkanol amines. All went through viscous, liquid crystal gels on dilution with water. They became very fluid after that. The triethanol amine soap was a viscous white fluid at 60% solids. Its stability was not noted at this solids, but a sample at 32% solids was stable for more than several weeks. Both ammonium and triethanolamine soaps were chalky, white fluids that could be diluted to as low as 0.07% adduct content with no apparent change in stability. The KOH soap differed in that a sample at 23% solids was not stable but separated overnight into two layers. It was easily re-emulsifiable, however, with agitation. At 20% and below, the fluid showed no tendency to break. With NaOH soaps, the high solids gels exhibited higher viscosities than the other alkali soaps had. Fluids in the 20–30% solids range were stable with no tendency to separate. Below 20% solids, the fluids were not chalky white as the other soaps but had a more translucent, opalescent appearance.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for the production of acrylic adduct of vegetable oil which comprises;
    (a) conjugating and elaidinizing the nonconjugated portion of fatty acid esters contained in said vegetable oil with a sufficient amount of catalyst to effect conjugation at a temperature between 200° C. and 270° C., wherein said catalyst is a member of the group consisting of iodine, sulfur dioxide and nickel, and
    (b) subsequently reacting conjugated double bond sites with acrylic acid at a temperature between 200° C. and 270° C., wherein said acrylic acid is added at a controlled rate.

2. The process according to claim 1 wherein said vegetable oil is a member of the group consisting of soya oil, cottonseed oil, corn oil, sunflower oil, safflower and linseed oil.

3. The process according to claim 1 wherein the amount of catalyst is from 0.05% to 1.5% by weight of said vegetable oil.

4. The process according to claim 3 wherein the temperature is between 230° C. and 260° C. and said catalyst is from 0.1% to 0.8% by weight of said vegetable oil.

5. The process according to claim 1 wherein said acrylic acid is added over about a 10 to 120-minute addition time in an amount of from 1.05 to 1.10 moles per mole of said vegetable oil.

* * * * *